United States Patent
Yoo

(10) Patent No.: US 11,046,281 B2
(45) Date of Patent: Jun. 29, 2021

(54) CURTAIN AIRBAG FOR VEHICLE

(71) Applicants: HYUNDAI MOTOR COMPANY, Seoul (KR); KIA MOTORS CORPORATION, Seoul (KR)

(72) Inventor: Jae Haeng Yoo, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 105 days.

(21) Appl. No.: 16/393,024

(22) Filed: Apr. 24, 2019

(65) Prior Publication Data
US 2020/0156585 A1    May 21, 2020

(30) Foreign Application Priority Data
Nov. 16, 2018 (KR) .......................... 10-2018-0142087

(51) Int. Cl.
| | |
|---|---|
| *B60R 21/232* | (2011.01) |
| *B60R 21/213* | (2011.01) |
| *B60R 21/261* | (2011.01) |
| *B60R 21/262* | (2011.01) |
| *B60R 21/276* | (2006.01) |
| *B60R 21/26* | (2011.01) |

(52) U.S. Cl.
CPC .......... *B60R 21/232* (2013.01); *B60R 21/262* (2013.01); *B60R 21/276* (2013.01); *B60R 2021/26058* (2013.01)

(58) Field of Classification Search
CPC ... B60R 21/232; B60R 21/213; B60R 21/262; B60R 21/261; B60R 2021/2615; B60R 2021/2612; B60R 2021/2617; B60R 2021/21531
See application file for complete search history.

(56) References Cited

U.S. PATENT DOCUMENTS

| | | | | |
|---|---|---|---|---|
| 6,123,355 | A | * | 9/2000 | Sutherland ............ B60R 21/231 280/728.2 |
| 6,135,493 | A | * | 10/2000 | Jost ........................ B60R 21/232 280/730.2 |
| 6,338,498 | B1 | * | 1/2002 | Niederman ........... B60R 21/213 280/728.2 |

(Continued)

FOREIGN PATENT DOCUMENTS

KR     10-1070147 B1    10/2011

*Primary Examiner* — Barry Gooden, Jr.
(74) *Attorney, Agent, or Firm* — Brinks Gilson & Lione

(57) ABSTRACT

A curtain airbag for a vehicle may include: a main chamber installed between a headliner and a vehicle body and provided to be downwardly unfolded to the interior of the vehicle; a diffuser being provided at an inlet portion of the main chamber connected with an inflator, formed with a first outlet and a second outlet which receive and discharge gas from the inflator; and an additional chamber connected with the second outlet of the diffuser and communicated with the second outlet to receive gas from the diffuser and inflated between the headliner and the vehicle body to separate the headliner from the vehicle body. In particular, the diffuser includes a joined portion to close partially or fully the first outlet, and the diffuser increases the gas supply to the main chamber when the joined portion is opened by an internal pressure of the diffuser.

11 Claims, 4 Drawing Sheets

(56) References Cited

U.S. PATENT DOCUMENTS

| | | | | |
|---|---|---|---|---|
| 6,457,740 | B1* | 10/2002 | Vaidyaraman | B60R 21/231 280/730.2 |
| 6,481,743 | B1* | 11/2002 | Tobe | B60R 21/232 280/728.2 |
| 6,830,262 | B2* | 12/2004 | Sonnenberg | B60R 21/232 280/729 |
| 7,390,016 | B2* | 6/2008 | Noguchi | B60R 21/232 280/730.2 |
| 7,967,332 | B2* | 6/2011 | Karlsson | B60R 21/214 280/730.2 |
| 8,585,080 | B2* | 11/2013 | Trevena | B60R 21/232 280/730.2 |
| 8,770,618 | B2* | 7/2014 | Fukawatase | B60R 21/232 280/730.2 |
| 9,440,610 | B2* | 9/2016 | Lee | B60R 21/26 |
| 2002/0180190 | A1* | 12/2002 | Tobe | B60R 21/232 280/730.2 |
| 2004/0239083 | A1* | 12/2004 | Mori | B60R 21/26 280/730.1 |
| 2006/0061071 | A1* | 3/2006 | Noguchi | B60R 21/232 280/730.2 |
| 2008/0012275 | A1* | 1/2008 | Pinsenschaum | B60R 21/232 280/730.2 |
| 2012/0200071 | A1* | 8/2012 | Trevena | B60R 21/213 280/730.2 |

\* cited by examiner ated with the second outlet to receive gas from the diffuser, the additional chamber configured to be inflated between the headliner and the vehicle body and to separate the headliner from the vehicle body.

CURTAIN AIRBAG FOR VEHICLE

CROSS REFERENCE TO RELATED APPLICATION

This application claims priority to and the benefit of Korean Patent Application No. 10-2018-0142087, filed on Nov. 16, 2018, the entire contents of which are incorporated herein by this reference.

FIELD

The present disclosure relates to a curtain airbag for a vehicle to protect the side of a passenger, in an airbag sector of the vehicle.

BACKGROUND

The statements in this section merely provide background information related to the present disclosure and may not constitute prior art.

Conventionally, in an airbag sector in a vehicle, a curtain airbag for a vehicle has been mostly installed between a headliner and a vehicle body.

Generally, a curtain airbag is installed along the longitudinal direction of the vehicle and unfolds to the interior of the vehicle between the headliner and the vehicle body to protect the side of the passenger when gas flows into the curtain airbag through an inflator.

However, we have discovered that there was a problem in that when the curtain airbag is unfolded between the headliner and the vehicle body, the curtain airbag is interfered with a trim so that the curtain airbag is not unfolded properly or the trim is damaged.

Therefore, a curtain airbag has been desired to protect the side of the passenger by avoiding interference with a trim when unfolded.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a curtain airbag for a vehicle, which is unfolded to the interior of the vehicle between a headliner and a vehicle body without interfering with a pillar trim to protect the side of a passenger, in an airbag sector of the vehicle.

A curtain airbag for a vehicle according to the present disclosure in order to achieve the above object may include: a main chamber installed between a headliner and a vehicle body and provided to be downwardly unfolded to the interior of the vehicle; a diffuser being provided at an inlet portion of the main chamber connected with an inflator, and formed with a first outlet and a second outlet which receive and discharge gas from the inflator wherein the diffuser includes a joined portion configured to close partially or fully the first outlet, and the diffuser is configured to increase an amount of the gas supplied to the main chamber when the joined portion is opened by an internal pressure of the diffuser; and an additional chamber connected with the second outlet of the diffuser and communicated with the second outlet to receive gas from the diffuser, the additional chamber configured to be inflated between the headliner and the vehicle body and to separate the headliner from the vehicle body.

The second outlet of the diffuser may be formed at a portion higher than the first outlet with respect to the height direction of the vehicle.

The first outlet of the diffuser may be formed to face the longitudinal direction of the vehicle; and the second outlet may be formed to face the upward direction of the vehicle.

The joined portion of the diffuser may be a sewing portion and the joined portion may be torn when the internal pressure of the diffuser is equal to or higher than a predetermined pressure.

A volume of the additional chamber when fully unfolded is set to be the same as a volume of a space between the headliner and the vehicle body.

The joined portion may be torn after the additional chamber is fully unfolded through the second outlet of the diffuser first and the main chamber may be expanded through the first outlet when the inflator is operated.

The additional chamber may be formed of a shape branched from the main chamber; and an inlet of the additional chamber may be closed by the diffuser and communicated with the inside of the diffuser through the second outlet of the diffuser.

A one-way vent portion may be provided at the second outlet of the diffuser; and the one-way vent portion may allow gas movement from the diffuser to the additional chamber and block gas movement from the additional chamber to the diffuser.

The second outlet of the diffuser may be a penetration hole shape; the one-way vent portion may be a cover having an area larger than that of the second outlet and covering the second outlet; and a part of an edge of the one-way vent portion may be coupled to the diffuser so that the remaining part of the edge supplies gas to the additional chamber through a portion not coupled with the diffuser.

The one-way vent portion may be coupled with an outer surface of the diffuser facing the inside of the additional chamber, so that the one-way vent portion covers and closes the second outlet to prevent gas from being reversely leaked from the additional chamber to the diffuser when the internal pressure of the additional chamber equal to or higher than a predetermined pressure is formed.

A one-way vent portion may be provided at the second outlet of the diffuser; an additional chamber supply hole may be formed at the one-way vent portion; and a fastening strap may be formed along the rim of the additional chamber supply hole so that the fastening strap is pulled to close the one-way vent portion.

The joined portion of the diffuser may be formed with a main chamber supply hole therein and formed of a sack shape which is a double layer made by folding an end portion; the additional chamber supply hole and the main chamber supply hole may be connected with each other through a tightening tether; and the double layer of the joined portion may be unfolded to be opened when the internal pressure of the diffuser is equal to or higher than a predetermined pressure so that the one-way vent portion is closed when the tightening tether pulls the fastening strap.

In accordance with the curtain airbag for the vehicle of the present disclosure, it is unfolded to the interior of the vehicle between the headliner and the vehicle body while avoiding interference with the pillar trim to protect the side of the passenger.

Particularly, the present disclosure has a merit that does not interfere with the pillar trim without installing a separate anti-interference member.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
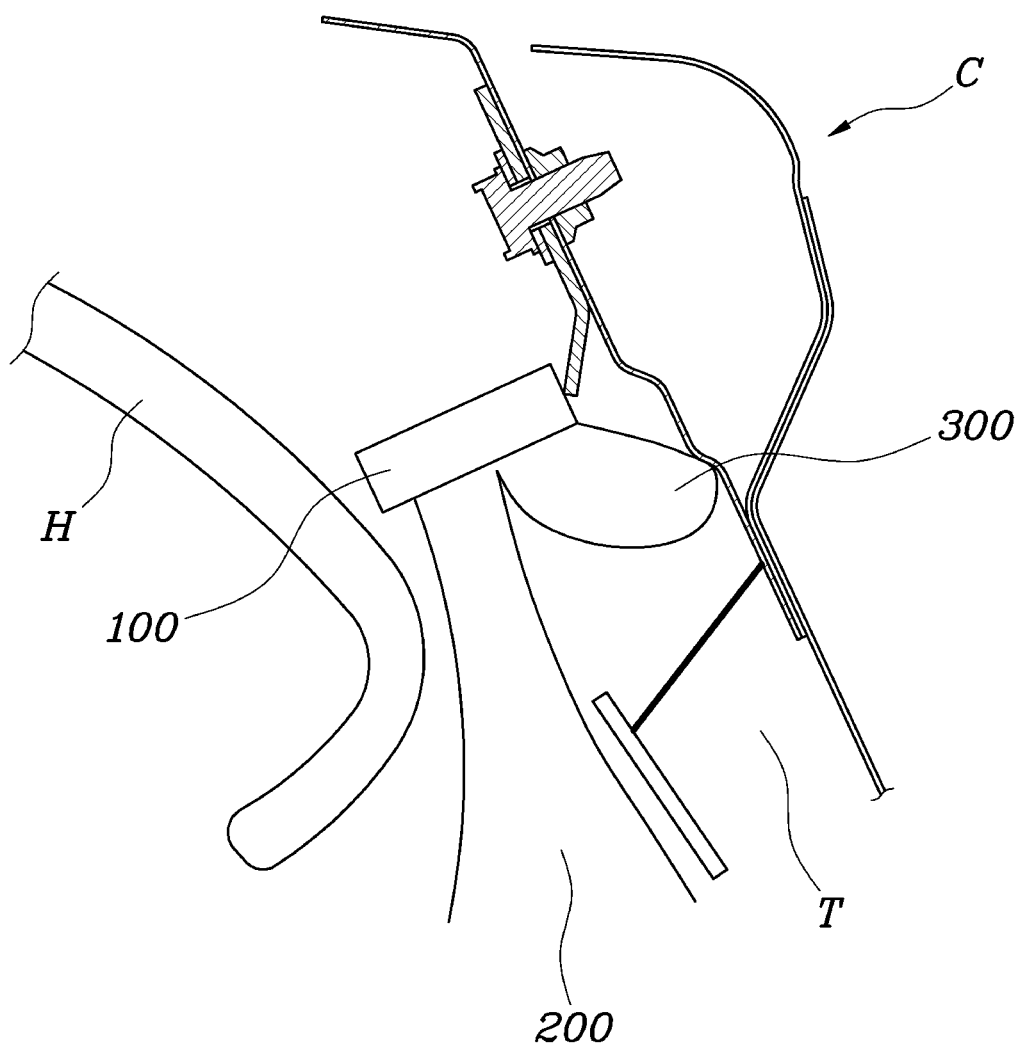
FIG. 1 is a drawing showing a curtain airbag for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a curtain airbag for a vehicle according to an exemplary form of the present disclosure will be described with reference to the attached drawing.

Figure 2:
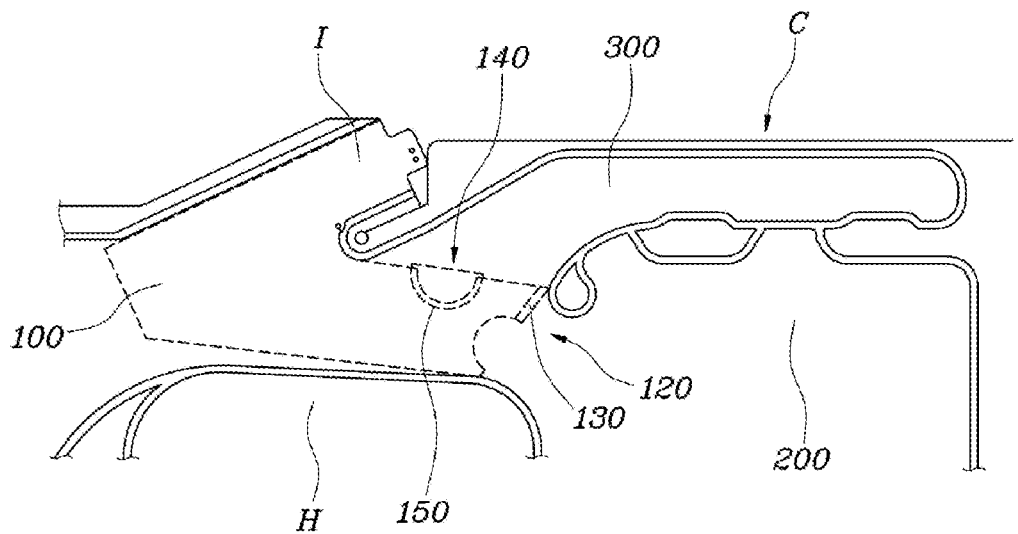
FIG. 2 is a drawing showing a structure of the curtain airbag for the vehicle according to an exemplary form of the present disclosure.
Figure 3:
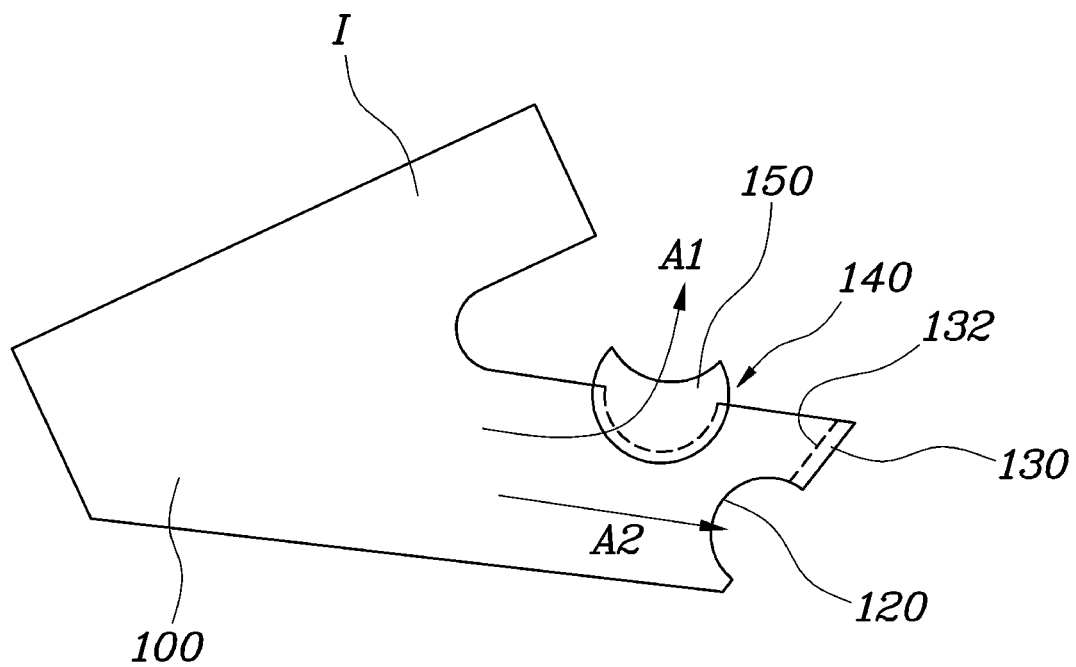
FIG. 3 is a drawing showing a state in which a one-way vent portion in the curtain airbag for the vehicle according to an exemplary form of the present disclosure is opened.
Figure 4:
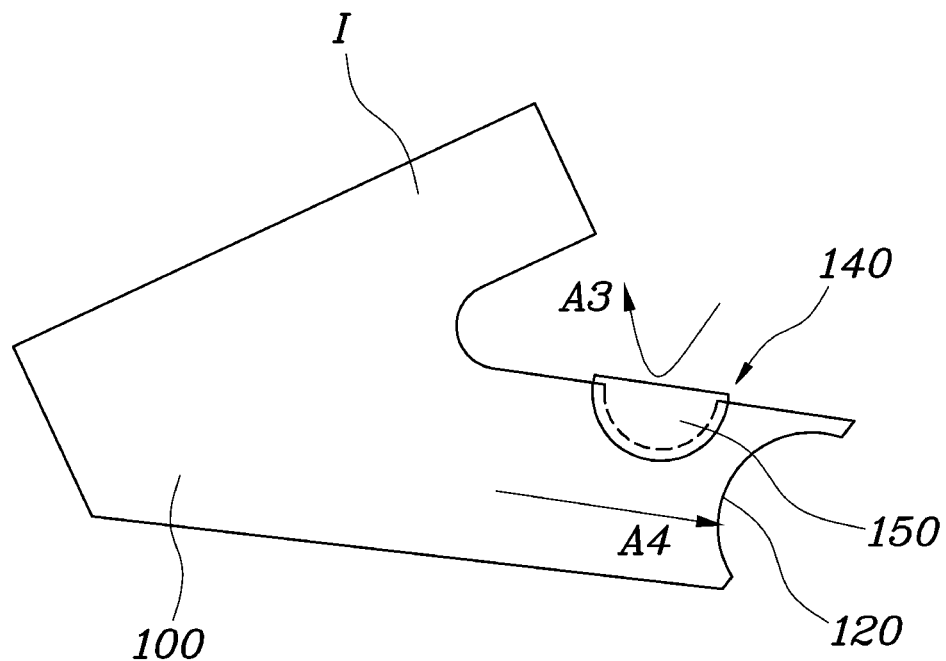
FIG. 4 is a drawing showing a state in which a one-way vent portion in the curtain airbag for the vehicle according to an exemplary form of the present disclosure is closed.
Figure 5:
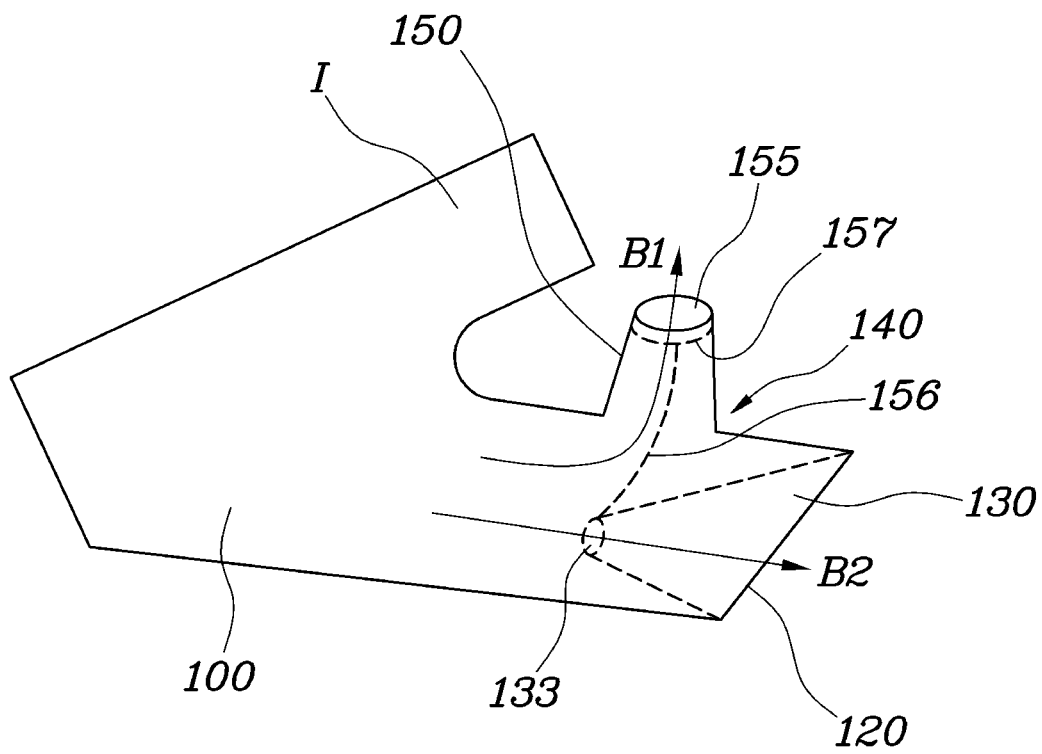
FIG. 5 is a drawing showing a state in which a one-way vent portion in the curtain airbag for the vehicle according to another exemplary form of the present disclosure is opened.
Figure 6:
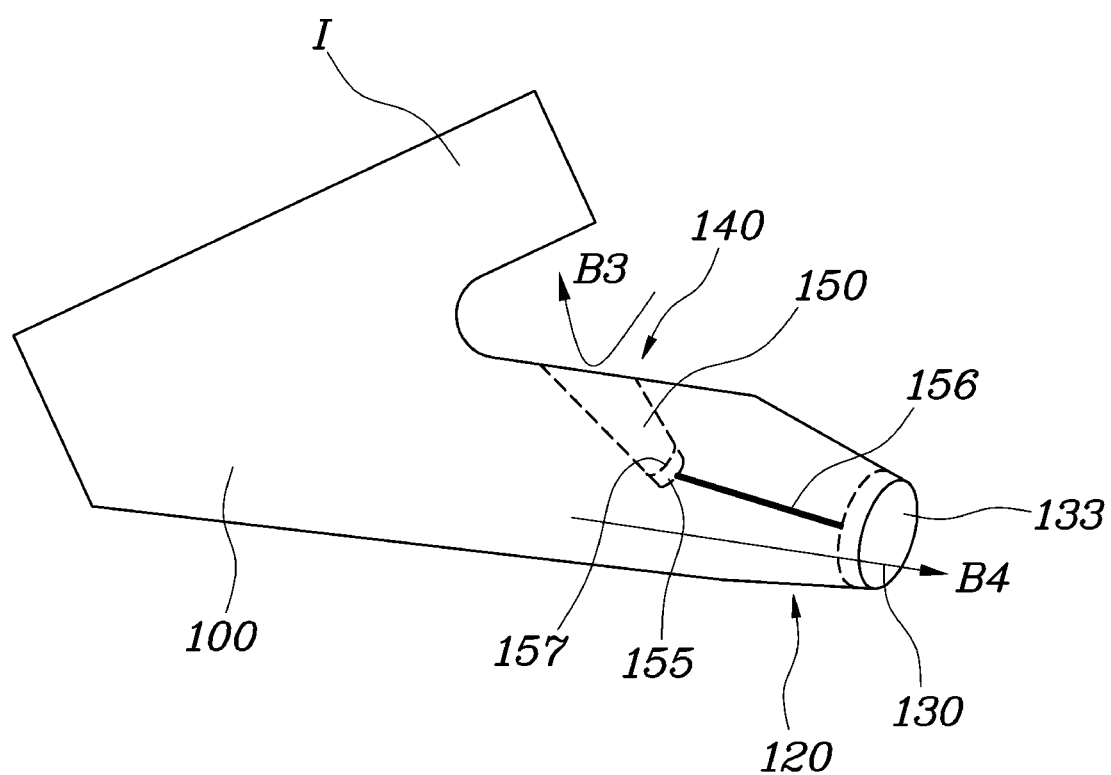
FIG. 6 is a drawing showing a state in which a one-way vent portion in the curtain airbag for the vehicle according to another exemplary form of the present disclosure is closed.

FIG. 1 is a drawing showing a curtain airbag for a vehicle according to an exemplary embodiment of the present disclosure; FIG. 2 is a drawing showing a structure of the curtain airbag for the vehicle; FIG. 3 is a drawing showing a state in which a one-way vent portion in the curtain airbag is opened; FIG. 4 is a drawing showing a state in which a one-way vent portion in the curtain airbag is closed; FIG. 5 is a drawing showing a state in which a one-way vent portion in the curtain airbag for the vehicle is opened; and FIG. 6 is a drawing showing a state in which a one-way vent portion in the curtain airbag for the vehicle is closed.

As shown in FIGS. 1 and 2, a curtain airbag for a vehicle according to the present disclosure may include: a main chamber 200 installed between a headliner H and a vehicle body C and provided to be downwardly unfolded to the interior of the vehicle; a diffuser 100 being provided at an inlet portion of the main chamber 200 connected with an inflator I, formed with a first outlet 120 and a second outlet 140 which receive and discharge gas from the inflator I; and an additional chamber 300 connected with the second outlet 140 of the diffuser 100 and communicated with the second outlet 140 to receive gas from the diffuser 100 and expanded between the headliner H and the vehicle body C to separate the headliner H from the vehicle body C. Moreover, the diffuser includes a joined portion 130 that partially or fully close the first outlet 120, and initiate or increase the gas supply to the main chamber 200 when the joined portion 130 is opened by an internal gas pressure of the diffuser.

In a case that the curtain airbag is unfolded between the headliner H and the vehicle body C as shown in FIG. 1, the curtain airbag is interfered with a trim T so that the curtain airbag cannot be properly unfolded or the trim T is damaged. Therefore, in order to address this problem, the present disclosure may include an additional chamber 300, which separates the headliner H from the vehicle body C, so that the main chamber 200 can be fully unfolded without interference with the trim T. Meanwhile, in a case that the additional chamber 300 is simultaneously unfolded together with the main chamber 200, and when the additional chamber 300 is not fully unfolded, the interference between the main chamber 200 and the trim T may occur. However, when the additional chamber 300 is first fully unfolded through the diffuser 100, the main chamber 200 can be fully unfolded without interference with the trim T because the headliner H is separated from the vehicle body C by the fully unfolded additional chamber 300.

On the other hand, as shown in FIG. 2, the second outlet 140 of the diffuser 100 may be formed at a portion higher than the first outlet 120 with respect to the height direction of the vehicle. Specifically, the first outlet 120 of the diffuser 100 may be formed to face a longitudinal direction of a vehicle and the second outlet 140 may be formed to face an upward of a vehicle. That is, in order that the additional chamber 300 can securely separate the headliner H from vehicle body C, the second outlet 140 may be disposed at a portion higher than the first outlet 120 and discharge the gas upwardly so that the additional chamber 300 can be unfolded upwardly.

Meanwhile, as shown in FIGS. 2 to 4, the joined portion 130 of the diffuser 100 according to the present disclosure may be a sewing portion 132, and the joined portion 130 may be torn when the internal pressure of the diffuser 100 is equal to or higher than a predetermined pressure. The joined portion 130 may be sewn to make the whole part of the first outlet 120 close or only a part of the first outlet 120 close and the other part of the first outlet 120 open. The shown exemplary form shows that the joined portion 130 closes a part of the first outlet 120. In a case that the joined portion 130 closes the whole part of the first outlet 120, when the joined portion 130 is torn, the gas inflow begins through the first outlet 120. In a case that the joined portion 130 closes a part of the first outlet 120, a small amount of gas is entered through the first outlet 120, and when the joined portion 130 is torn, the whole part of the first outlet 120 is opened so that a large amount of gas is expanded and entered into the main chamber 200.

As shown in FIG. 3, in a case that the internal pressure of the diffuser 100 is equal to or less than a predetermined pressure, the inside gas of the diffuser 100 is blocked by the sewing portion 132 so that only a small amount of gas can be supplied through the first outlet 120 ("A2" path of FIG. 3). And, most of the gas flowed into the inside of the diffuser 100 from the inflator I is primarily discharged to the additional chamber 300 through the second outlet 140 ("A1" path of FIG. 3).

Thereafter, when the additional chamber 300 is unfolded to increase the internal pressure of the diffuser 100, the sewing portion 132 is torn out, whereby the first outlet 120 is fully opened and gas discharge area is expanded ("A4" path of FIG. 4). As a result, it is able to induce the main chamber 200 to be fully unfolded after the additional chamber 300 is unfolded.

Additionally, a volume of the additional chamber 300 when fully unfolded maybe set to be the same as a volume of the space between the headliner H and the vehicle body C. If the volume of the additional chamber 300 is too small, the separation between the headliner H and the vehicle body C is not sufficient so that the deployment of the main chamber 200 is not smooth. If the volume of the additional chamber 300 is too large, the deployment time of the main chamber 200 is so much slower so that the capacity of the inflator I should be increased in order to secure the capacity of the chambers. Therefore, it is desirable that the volume of the additional chamber 300 in the fully unfolded is located in the space between the headliner H and the vehicle body C, and designed to have a size that fully separates the headliner H from the vehicle body C.

Further, as shown in FIGS. 1 to 4, the joined portion 130 is torn after the additional chamber 300 is fully unfolded first through the second outlet 140 of the diffuser 100 when the inflator I is operated in the present disclosure, so that the expansion of the main chamber 200 can be expanded through the first outlet 120. As like this, since the main chamber 200 is inflated to be unfolded after the vehicle body C and the headliner H is fully separated from each other by the additional chamber 300 unfolded first, the main chamber 200 can be unfolded to the interior of the vehicle without interference with the trim C to protect the side of the passenger.

On the other hand, as shown in FIGS. 1 and 2, the additional chamber 300 of the present disclosure may be formed of a shape branched from the main chamber 200, and the inlet of the additional chamber 300 may be closed by the diffuser 100 and communicated with the inside of the diffuser 100 through the second outlet 140 of the diffuser 100. Through such a configuration, the additional chamber 300 and the main chamber 200 may be formed of one material, but may have a spatially separated configuration by the diffuser 100. Further, since the main chamber 200 is only supplied in small quantities and the gas is fully supplied to the additional chamber 300 first when the gas inflow starts, the expansion of the main chamber 200 can be secured with the headliner H open enough.

Therefore, even if the additional chamber 300 is expanded to move the diffuser 100, the first outlet 120 is always disposed at the inlet of the main chamber 200 to prevent the main chamber 200 from being not unfolded because the main chamber 200 moves together.

On the other hand, as shown in FIGS. 3 and 4, a one-way vent portion 150 may be provided at the second outlet 140 of the diffuser 100 according to the present disclosure, and the one-way vent portion 150 may allow the gas movement from the diffuser 100 to the additional chamber 300 but prevent the gas movement from the additional chamber 300 to the diffuser 100. That is, the gas movement is allowed along the "A1" path in FIG. 3 but the gas movement is blocked along the "A3" path in FIG. 4.

Further, the second outlet 140 of the diffuser 100 may be formed in a penetration hole shape, the one-way vent portion 150 may have an area larger than the second outlet 140 and may be a cover covering the second outlet 140, and only a part of the rim of the one-way vent section 150 may be coupled with the diffuser 100 to supply gas to the additional chamber 300 through the remaining part of the rim that is not coupled with the diffuser 100. Specifically, the one-way vent portion 150 may be coupled with an outer surface of the diffuser 100 facing the inside of the additional chamber 300, such that the one-way vent portion 150 covers and closes the second outlet 140 when the additional chamber 300 has an internal pressure higher than a predetermined pressure, thereby preventing gas leakage from the additional chamber 300 to the diffuser 100 reversely. That is, in a case that gas moves along the "A1" path in FIG. 3, the gas flows into the additional chamber 300 while pushing a portion which is not coupled with the diffuser in the one-way vent portion 150. However, in a case that the internal pressure higher than a predetermined pressure is formed in the additional chamber 300 after the additional chamber 300 is unfolded, the one-way vent portion 150 covers the second outlet 140 so that gas cannot move along the "A3" path in FIG. 4.

Meanwhile, as shown in FIGS. 5 and 6, in the curtain airbag for the vehicle according to the present disclosure, the one-way vent portion 150 of a sack shape may be provided at the second outlet 140 of the diffuser 100 and an upper end portion of the one-way vent portion 150 may be opened to form an additional chamber supply hole 155. A fastening strap 157 may be inserted along the rim of the additional chamber supply hole 155 so that the fastening strap 157 may be pulled to close the one-way vent portion 150. Specifically, a main chamber supply hole 133 may be formed in the joined portion 130 of the diffuser 100, which is a sack shape made by folding an end portion to form a double layer. The additional chamber supply hole 155 and the main chamber supply hole 133 may be connected with each other through a tightening tether 156. In a case that the internal pressure of the diffuser 100 is equal to or higher than a predetermined pressure, the joined portion 130 may be opened while the double layer is unfolded, such that the tightening tether 156 pulls fastening strap 157 to close the one-way vent portion 150. As shown in FIG. 5, the gas flows along the "B1" path and passes the one-way vent portion 150 of which the upper end portion is opened to flow into the additional chamber 300. When the internal pressure of the additional chamber 300 is equal to or higher than a predetermined pressure, the internal pressure of the diffuser 100 increases to pressurize the joined portion 130 at the first outlet 120, such that the joined portion 130 is unfolded toward the main chamber 200 and gas flows into the main chamber 200 through the main chamber supply hole 133 ("B4" path of FIG. 6). In this case, the joined portion 130 is unfolded to pull the fastening strap 157 and the additional chamber supply hole 155 is closed while the tightening tether 156 connected with the fastening strap 157 is tighten. As a result, the main chamber 200 is unfolded after the additional chamber 300 is unfolded.

Although specific forms of the present disclosure has been described and illustrated, those skilled in the art will appreciate that various alternations and modifications are possible without departing from the technical spirit of the present disclosure.

What is claimed is:

1. A curtain airbag for a vehicle, comprising:
   a main chamber installed between a headliner and a vehicle body and provided to be downwardly unfolded to an interior of the vehicle;
   a diffuser being provided at an inlet portion of the main chamber connected with an inflator, and formed with a first outlet and a second outlet which receive gas from the inflator, wherein the diffuser includes a joined portion configured to close partially or fully the first outlet, and the diffuser is configured to increase an amount of the gas supplied to the main chamber when the joined portion is opened by an internal pressure of the diffuser; and an additional chamber connected with the second outlet of the diffuser and communicated with the second outlet to receive the gas from the diffuser, the additional chamber configured to be inflated between the headliner and the vehicle body and to separate the headliner from the vehicle body, wherein:

the joined portion is torn after the additional chamber is fully unfolded through the second outlet of the diffuser first, and the main chamber is expanded through the first outlet when the inflator is operated.

2. The curtain airbag for the vehicle of claim 1, wherein the joined portion of the diffuser is a sewing portion and the joined portion is torn when the internal pressure of the diffuser is equal to or higher than a predetermined pressure.

3. The curtain airbag for the vehicle of claim 1, wherein a volume of the additional chamber when fully unfolded is set to be the same as a volume of a space between the headliner and the vehicle body.

4. The curtain airbag for the vehicle of claim 1, wherein:
the additional chamber is formed of a shape branched from the main chamber; and
an inlet of the additional chamber is closed by the diffuser and communicated with an inside of the diffuser through the second outlet of the diffuser.

5. The curtain airbag for the vehicle of claim 1, wherein the second outlet of the diffuser is formed at a portion higher than the first outlet with respect to a height direction of the vehicle.

6. The curtain airbag for the vehicle of claim 5, wherein:
the first outlet of the diffuser is formed to face a longitudinal direction of the vehicle; and
the second outlet is formed to face an upward direction of the vehicle.

7. The curtain airbag for the vehicle of claim 1, wherein:
a one-way vent portion is provided at the second outlet of the diffuser;
an additional chamber supply hole is formed at the one-way vent portion; and a fastening strap is formed along a rim of the additional chamber supply hole so that the fastening strap is pulled to close the one-way vent portion.

8. The curtain airbag for the vehicle of claim 7, wherein:
the joined portion of the diffuser is formed with a main chamber supply hole therein and formed of a sack shape which is a double layer made by folding an end portion;
the additional chamber supply hole and the main chamber supply hole are connected with each other through a tightening tether; and
the double layer of the joined portion is unfolded to be opened when the internal pressure of the diffuser is equal to or higher than a predetermined pressure so that the one-way vent portion is closed when the tightening tether pulls the fastening strap.

9. The curtain airbag for the vehicle of claim 1, wherein:
a one-way vent portion is provided at the second outlet of the diffuser; and
the one-way vent portion is configured to allow gas movement from the diffuser to the additional chamber and to block the gas movement from the additional chamber to the diffuser.

10. The curtain airbag for the vehicle of claim 9, wherein:
the second outlet of the diffuser is a penetration hole shape;
the one-way vent portion is a cover having an area larger than the second outlet and configured to cover the second outlet; and
a part of an edge of the one-way vent portion is coupled with the diffuser so that the remaining part of the edge supplies gas to the additional chamber through a portion not coupled with the diffuser.

11. The curtain airbag for the vehicle of claim 10, wherein the one-way vent portion is coupled with an outer surface of the diffuser facing an inside of the additional chamber, so that the one-way vent portion covers and closes the second outlet to prevent gas from being reversely leaked from the additional chamber to the diffuser when an internal pressure of the additional chamber equal to or higher than a predetermined pressure is formed.

* * * * *